United States Patent [19]

Walters et al.

[11] 4,234,154
[45] Nov. 18, 1980

[54] TACKLE BOX ROD HOLDER

[76] Inventors: Edward A. Walters, 14901 NE. 5 Ct., Apt. 2, N. Miami, Fla. 33161; James J. Walters, 360 Fiesta Ave., Apt. 214, Jupiter-Tequesta, Fla. 33458

[21] Appl. No.: 40,885

[22] Filed: May 21, 1979

[51] Int. Cl.³ ............................................. A01K 97/10
[52] U.S. Cl. ................................... 248/539; 248/519
[58] Field of Search ............... 248/518, 519, 520, 534, 248/538, 535, 539; 312/DIG. 33

[56] References Cited

U.S. PATENT DOCUMENTS

| 279,708 | 6/1883 | Clark | 248/539 X |
|---|---|---|---|
| 2,596,403 | 5/1952 | Hoffman | 248/519 X |
| 3,051,422 | 8/1962 | Crump et al. | 248/518 |
| 3,077,327 | 2/1963 | Batie et al. | 248/520 |
| 3,327,978 | 6/1967 | Gates | 248/520 |
| 3,546,805 | 12/1970 | Schaeffer | 248/520 X |
| 3,555,719 | 1/1971 | Butler | 248/538 X |
| 3,558,023 | 1/1971 | Yoshito | 220/94 R X |

Primary Examiner—J. Franklin Foss

[57] ABSTRACT

A tackle box rod holder including a generally cylindrical tube portion having a first and second end and means for connecting the tube portion to a tackle box for secure and fixed attachment without interfering with the normal swingable operation of the tackle box.

3 Claims, 6 Drawing Figures

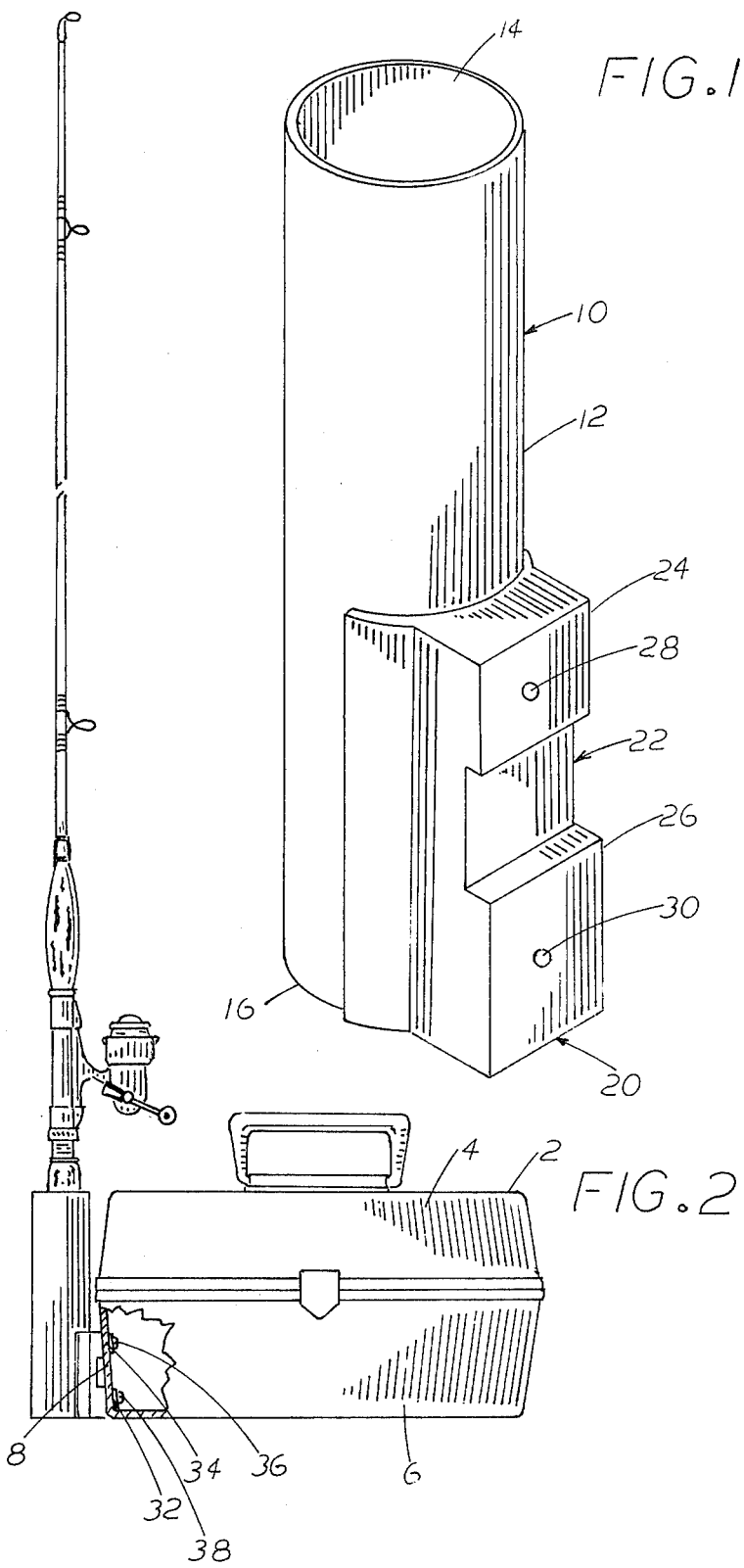

TACKLE BOX ROD HOLDER

This is a previously abandoned application No. 690,161, filed initially June 6, 1976 and abandoned on Oct. 22, 1977. The prior art cited in a previous rejection of this previously abandoned application is as follows: U.S. Pat. Nos. 3,051,422; 3,543,432; 3,603,019; 3,327,978; and 3,021,101.

FIELD OF THE INVENTION

This invention relates to fishing rod holders and, more particularly, to fishing rod holders built onto, into or removably attached to a tackle box.

BACKGROUND OF THE INVENTION

Various different rod holders have been provided as cited in the previously abandoned case. However, none of the rod holders cited by the Examiner at that time or discovered by applicant the fishing enthusiast the versatility and simplicity of design which is embodied in applicant's invention.

OBJECTS OF THE INVENTION

An object of this invention is to provide a tackle box holder of simple and efficient design which allows a user to place his fishing rod in the holder so that the rod may stand upright.

Another object of this invention is to provide a rod holder which is of generally cylindrical shape having a first and second open end and a means for connection of the tube portion to the tackle box.

Another object of this invention is to provide a rod holder which can be removably attached to the tackle box.

Another object of this invention is to provide a rod holder which can be molded within the confines of the tackle box without interfering with the normal operation of the tackle box.

Another object of this invention is to provide a rod holder which can be molded to the lower portion of a tackle box outside side wall.

A general object of this invention is to provide a structure as has been previously described and as will be hereinafter described to accomplish the objects and general purposes of the invention.

DESCRIPTION OF THE DRAWINGS

FIG. 1 shows an elevated plan view of one embodiment of the invention detached from the tackle box;

FIG. 2 shows the embodiment of the rod holder in FIG. 1 connected to the tackle box by screw means;

DESCRIPTION OF THE PREFERRED EMBODIMENT

Figure 3:
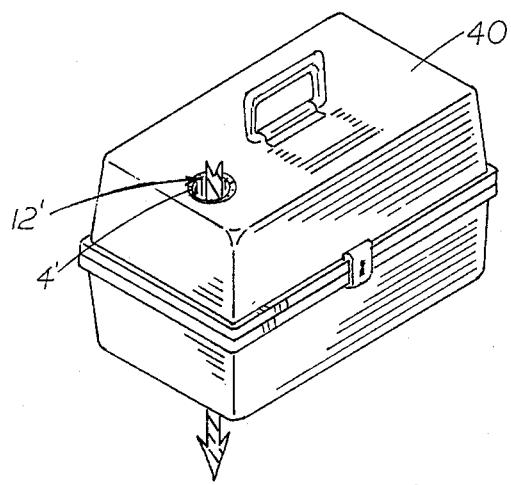
FIG. 3 shows a perspective view of another embodiment of the rod holder where the holder is inside the tackle box itself.

Referring to the drawings wherein like reference characters designate like or corresponding parts throughout the several views and referring particularly to FIG. 1, there is shown a first embodiment of the rod holder generally designated by the numeral 10 comprising a tube portion designated by the numeral 12 having a first open end 14 and a second open end 16.

With particular reference to FIG. 2, there is shown the embodiment depicted in FIG. 1 connected to the tackle box generally designated by the numeral 2. The means for connecting the tackle box and the rod holder is generally designated by the numeral 20 and it comprises a bifurcated raised boss section generally designated by the numeral 22. Each section 24 and 26 has a hole generally designated 28 and 30 respectively. The tackle box includes a top section designated by the numeral 4 and a bottom section 6. The two sections are swingable with respect to one another. The bottom section 6 includes an outside side wall 8 having two holes 32 and 34 which are aligned with holes 28 and 30 of the holder. Screws 36 and 38 are provided for fixed removable connection of the holder to the tackle box.

Figure 4:
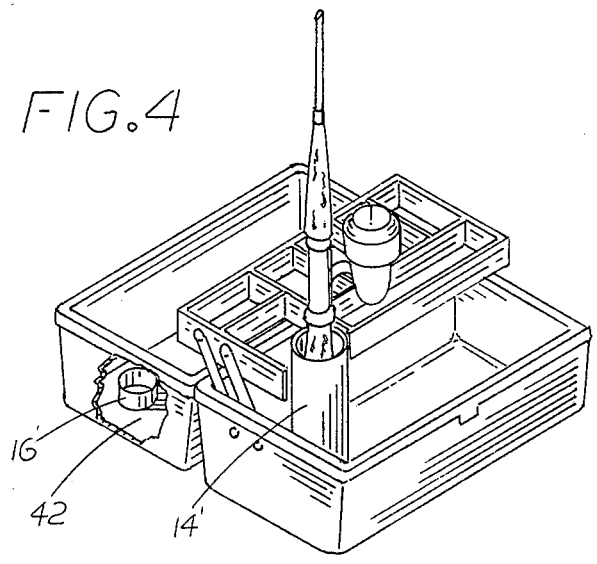
FIG. 4 shows a perspective view of the rod holder when the box is in the open position.

With particular reference to FIGS. 3 and 4 there is shown another embodiment of applicant's invention wherein the tube portion 12' is shown bifurcated in FIG. 4 having a first portion 14' and a second portion 16'. The tube is fitted to hole 4' in the tackle box, as shown. The tackle box includes a top surface 40 and a bottom surface 42. The tube sections 14' and 16' are connected at hole 4' to the top and bottom surfaces respectively. It will be noticed that the user may use the rod holder when the tackle box is in either the open or closed position as shown in FIGS. 3 and 4.

Figure 5:
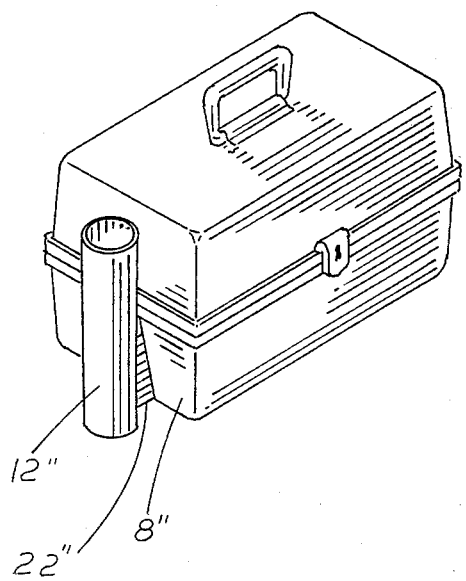
FIG. 5 shows a perspective view of another embodiment of the rod holder molded to the bottom side surface of the tackle box.
Figure 6:
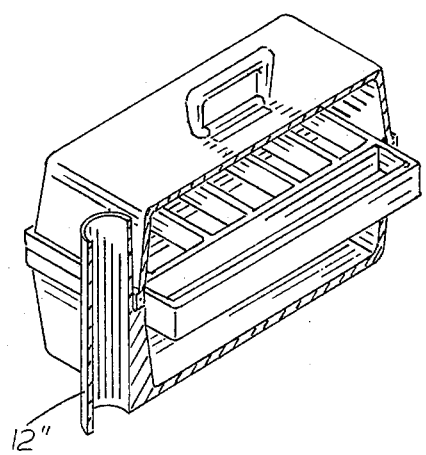
FIG. 6 is a perspective view of the embodiment shown in FIG. 5 in cross section.

With particular reference to FIGS. 5 and 6, there is shown another embodiment of applicant's invention whereby the tube portion 12" is molded to the bottom side surface 8" by raised section 22". As shown in FIG. 6 the rod holder compatibly engages the tackle box without interfering with the normal operation of the tackle box. Further, the user may place his rod in the holder without interfering with the normal swingable operation of the tackle box.

What is claimed is:

1. A tackle box rod holder for tackle boxes having a top surface having an opening and a bottom surface having an opening with the openings being aligned and the surfaces being swingable with respect to another, the tackle box rod holder comprising,
    a bifurcated generally cylindrical tubular member having a first portion with a first end fixedly connected to and aligned with the top surface opening and a second open end adapted for connection with a fishing rod when the box is in an open position,
    the tubular member including a second portion having a first end connected to the bottom surface and a second open end with the portions being aligned such that a rod may extend comfortably through the member unobstructedly when the box is in the closed position,
    thereby when the box is in the open position the second open end of the first portion serves as an open end in which a rod may be inserted when the box is in the open position, and
    thereby when the box is in the closed position the bifurcated tubular member extends through the tackle box between the openings in the top and bottom portions without obstructing the swingable relation of the top and bottom portions.

2. The device as set forth in claim 1 wherein the bifurcated tube member is made of a relatively stiff synthetic material.

3. The device as set forth in claim 2 wherein the device is made of polyvinyl chloride.

* * * * *